United States Patent
Shama et al.

(10) Patent No.: US 11,768,915 B1
(45) Date of Patent: Sep. 26, 2023

(54) SYSTEM, METHOD, AND COMPUTER PROGRAM FOR ANOMALY DETECTION IN TIME-SERIES DATA WITH MIXED SEASONALITY

(71) Applicant: Amdocs Development Limited, Limassol (CY)

(72) Inventors: Gilli Shama, Ra'anana (IL); Yaniv Avrashi, Petach Tikva (IL); Nadeem Azaizah, Dabburiya (IL); Pavel Vodolazov, Petah Tikva (IL)

(73) Assignee: AMDOCS DEVELOPMENT LIMITED, Limassol (CY)

(*) Notice: Subject to any disclaimer, the term of this patent is extended or adjusted under 35 U.S.C. 154(b) by 373 days.

(21) Appl. No.: 16/983,951

(22) Filed: Aug. 3, 2020

(51) Int. Cl.
*G06F 18/22* (2023.01)
*G06N 20/00* (2019.01)
*G06F 18/10* (2023.01)
*G06F 18/23* (2023.01)
*G06F 18/2413* (2023.01)

(52) U.S. Cl.
CPC .............. *G06F 18/22* (2023.01); *G06F 18/10* (2023.01); *G06F 18/23* (2023.01); *G06F 18/24137* (2023.01); *G06N 20/00* (2019.01)

(58) Field of Classification Search
CPC .. G06K 9/6215; G06K 9/6218; G06K 9/6272; G06K 9/6298; G06N 20/00; G06F 18/22
See application file for complete search history.

(56) References Cited

U.S. PATENT DOCUMENTS

| 8,949,677 | B1 | 2/2015 | Brundage et al. |
| 9,652,354 | B2 | 5/2017 | Filimonov et al. |
| 2012/0136909 | A1 | 5/2012 | Wang et al. |
| 2017/0147930 | A1* | 5/2017 | Bellala ............... G06N 5/04 |
| 2019/0179835 | A1 | 6/2019 | Pallath et al. |
| 2019/0228022 | A1 | 7/2019 | Garvey et al. |
| 2020/0210393 | A1* | 7/2020 | Beaver ............. G06F 17/18 |

FOREIGN PATENT DOCUMENTS

| EP | 3120248 A1 | 1/2017 |
| EP | 3623964 A1 | 3/2020 |
| WO | 2016132282 A1 | 8/2016 |

OTHER PUBLICATIONS

Izakian, H., "Cluster-Centric Anomaly Detection and Characterization in Spatial Time Series," Thesis, Department of Electrical and Computer Engineering University of Alberta, 2014, 153 pages.
Schafer et al., "SFA: A Symbolic Fourier Approximation and Index for Similarity Search in High Dimensional Datasets," EDBT, ACM, Mar. 2012, 13 pages.
Schafer, P., "Bag-Of-SFA-Symbols in Vector Space (BOSS VS)," ZIB Report, May 2015, 24 pages.

* cited by examiner

*Primary Examiner* — Van H Oberly

(74) *Attorney, Agent, or Firm* — Zilka-Kotab, P.C.

(57) ABSTRACT

As described herein, a system, method, and computer program are provided for anomaly detection in time-series data with mixed seasonality. In use, time-series data of a mixed seasonality type is received. Additionally, the time-series data is segmented, by a defined unit of time, to form a plurality of time-series data segments. Further, the plurality of time-series data segments are processed to determine one or more patterns across the plurality of time-series data segments. Still yet, the one or more patterns are stored and used to perform pattern matching for an input time-series.

17 Claims, 6 Drawing Sheets

SYSTEM, METHOD, AND COMPUTER PROGRAM FOR ANOMALY DETECTION IN TIME-SERIES DATA WITH MIXED SEASONALITY

FIELD OF THE INVENTION

The present invention relates to detecting anomalies in time-series data.

BACKGROUND

Anomaly detection is the process of identifying unexpected items or events in data sets, and in particular items or events in data sets that deviate from what is considered "normal" or "expected." Anomaly detection in data is useful for many purposes, including identification of errors, detection of security threats, among others.

One application of anomaly detection relates to time-series data. Anomaly detection in a time-series is of a high value, particularly in areas of financial and sales time-series data, information technology (IT) and network monitoring data, health and care time-series data and many more. There are many existing models for anomaly detection, including: autoregressive integrated moving average (ARIMA), time-series decomposition, neural net methods such as long short-term memory (LSTM), as well as a variety of regression models to predict upcoming values. However, current anomaly detection techniques as applied to time-series data generally do not take into consideration time-series data having repetitions that are mixed (i.e. that involve some noise and volume changes).

There is thus a need for addressing these and/or other issues associated with the prior art.

SUMMARY

As described herein, a system, method, and computer program are provided for anomaly detection in time-series data with mixed seasonality. In use, time-series data of a mixed seasonality type is received. Additionally, the time-series data is segmented, by a defined unit of time, to form a plurality of time-series data segments. Further, the plurality of time-series data segments are processed to determine one or more patterns across the plurality of time-series data segments. Still yet, the one or more patterns are stored and used to perform pattern matching for an input time-series.

DETAILED DESCRIPTION

Figure 1:
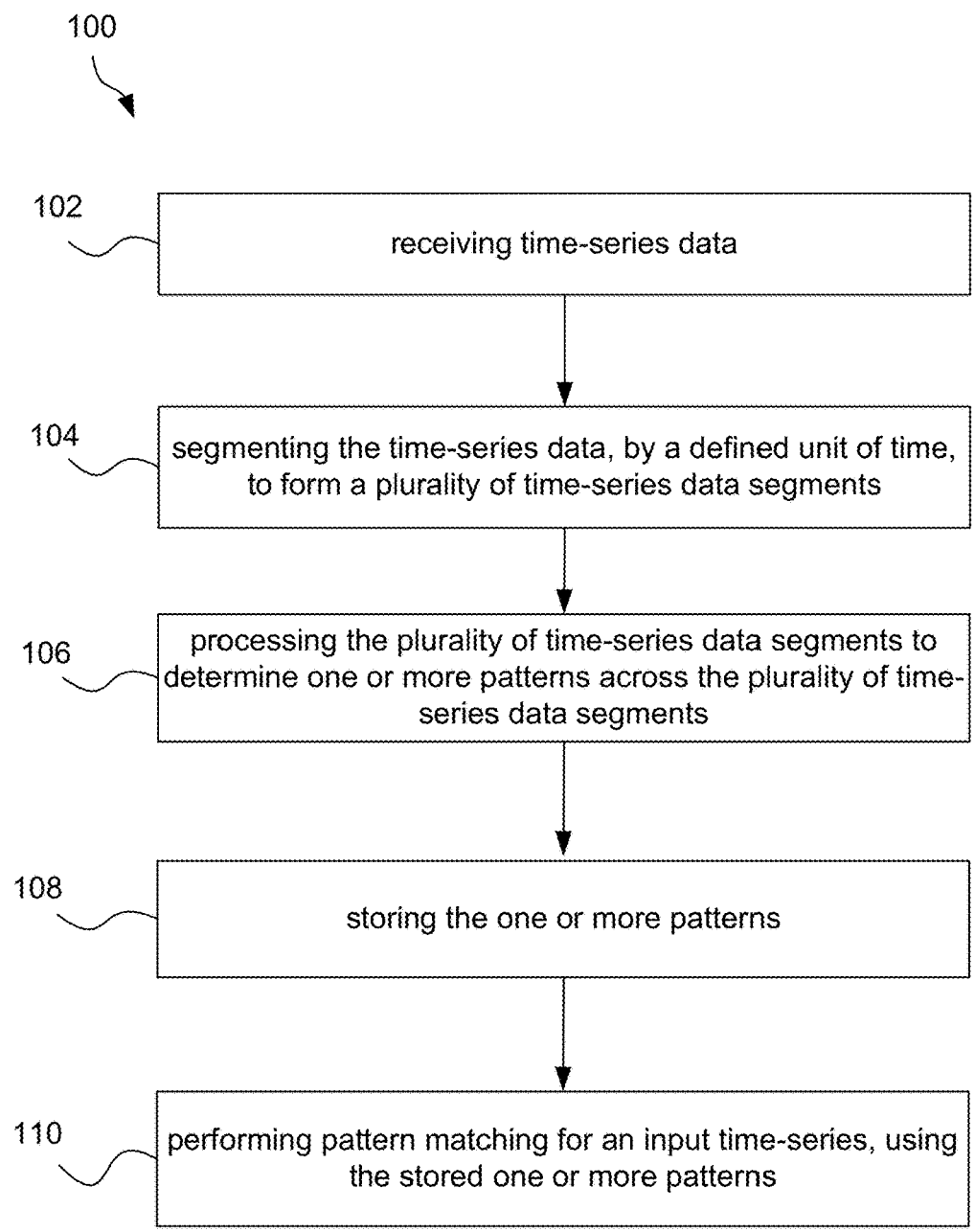
FIG. 1 illustrates a method for anomaly detection in time-series data with mixed seasonality, in accordance with one embodiment.

FIG. 1 illustrates a method 100 for anomaly detection in time-series data with mixed seasonality, in accordance with one embodiment. The method 100 may be carried out by any system that includes at least one processor. For example, the method 100 may be carried using the computer system described below with reference to FIG. 6.

As shown in operation 102, time-series data of a mixed seasonality type is received. The time-series data is any sequence of data points in a successive time-based order. The data points may represent any desired type of data. Just by way of example, the data points may represent transactions, network-based events, usage related metrics (e.g. related to payments, visits, or activations), etc. Thus, the time-series data may be a single time-series.

The time-series data may be received from any source storing the time-series data. In the example where the data points of the time-series data represent network-based events, the time-series data may be received from a network provider, as an option. In the example where the data points of the time-series data represent transactions, the time-series data may be received from a service provider or other business entity.

As noted above, the time-series data is of a mixed seasonality type. A mixed seasonality type of time-series data (also referred to as time-series data with mixed seasonality) refers to time-series data having portions that repeat on a time-wise basis (e.g. days, weeks, months, etc.) with some trend, and which may also include some noise and/or volume changes.

The identification of the time-series data as being of a mixed seasonality type may be made using a machine learning algorithm, in one embodiment. The machine learning algorithm may be trained using a plurality of time-series' each manually labeled with whether or not the time-series is of the mixed seasonality type. The machine learning algorithm may be trained to process an input time-series to infer whether the input time-series is of the mixed seasonality type. Of course, other embodiments are also contemplated for identifying the time-series data as being of the mixed seasonality type. In any case, the method 100 may apply to time-series data that is of the mixed seasonality type.

Additionally, in operation 104, the time-series data is segmented, by a defined unit of time, to form a plurality of time-series data segments. The unit of time may be one day (i.e. 24 hours) beginning at a defined start time (e.g. midnight), one week beginning at a defined start time (e.g. start day and time), one month beginning at a defined start time, weekdays versus weekends, or any other repeating period of time. The unit of time may be predefined by a user, in one embodiment. Segmenting the time-series data may refer to apportioning the time-series data into the plurality of time-series data segments (i.e. portions), according to the defined unit of time.

As an option, the time-series data may be pre-processed prior to being segmented. The pre-processing may include completing missing points within the time-series data, in on embodiment. In another embodiment, the pre-processing may include re-sampling the time-series data.

As a further option, the each time-series data segment of the plurality of time-series data segments may be normalized. By way of example, the normalization of each time-series data segment may include subtracting a minimum point value in the time-series data segment to obtain a resulting time-series data segment, and then dividing the resulting time-series data segment by an integral of data included in the resulting time-series data segment. Of course, other normalization techniques may be used as desired.

Further, in operation 106, the plurality of time-series data segments are processed to determine one or more patterns across the plurality of time-series data segments. The processing may include clustering the time-series data segments into a plurality of clusters. The time-series data segments may be clustered by defining a distance between each possible pair of time-series data segments (e.g. using Fourier coefficients), and grouping the time-series data segments into the clusters based on the distances defined for the time-series data segments (e.g. using Gaussian mixture model (GMM)). More exemplary details regarding this clustering will be described with respect to FIG. 2 below.

The patterns may then be determined based on the clusters. For example, each cluster may be determined to be a pattern when the cluster includes at least a threshold number of time-series data segments. In one embodiment, each pattern may be characterized based on typical behavior and a normal range. For example, the each pattern may be characterized based on predefined parameters, such as a standard representative value, a lower bound, and an upper bound. The standard representative value may be an average for each sampled point in a representative time-series data segment. The lower bound and the upper bound may be defined based on a preconfigured confidence interval. Again, more exemplary details regarding this characterization will be described with respect to FIG. 2 below.

In any case, as noted above, the time-series data segments are processed to determine one or more patterns across the plurality of time-series data segments, and thus patterns for the time-series data. Still yet, in operation 108, the one or more patterns are stored. In particular, the patterns are stored for use in subsequent pattern matching processes which may be used to detect anomalies in additional time-series data.

To this end, as shown in operation 110, the stored one or more patterns are used to perform pattern matching for an input time-series. The input time-series may be received from a same source as the time-series data received in operation 102, in one embodiment. In another embodiment, the input time-series may include data points representing a same type of data as the time-series data received in operation 102.

The pattern matching may be performed such that, for each time (data) point in the input time-series, a segment in the input time-series from time zero to the time point is determined, and then it is determined whether the segment matches any of the patterns. Determining whether the segment matches any of the patterns may be based on a distance between the segment and each of the patterns. In an embodiment, for a segment matching a pattern, a range of upcoming normal values may be predicted for the input time-series, and any measured value or data point within the input-time series that is out of the range may be detected as an anomaly. Accordingly, the method 100 may provide accurate anomaly detection with fast performance, for mixed seasonality time-series, and may further require no manual configuration of special (i.e. abnormal) units of time (e.g. special days in a week/month/year).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
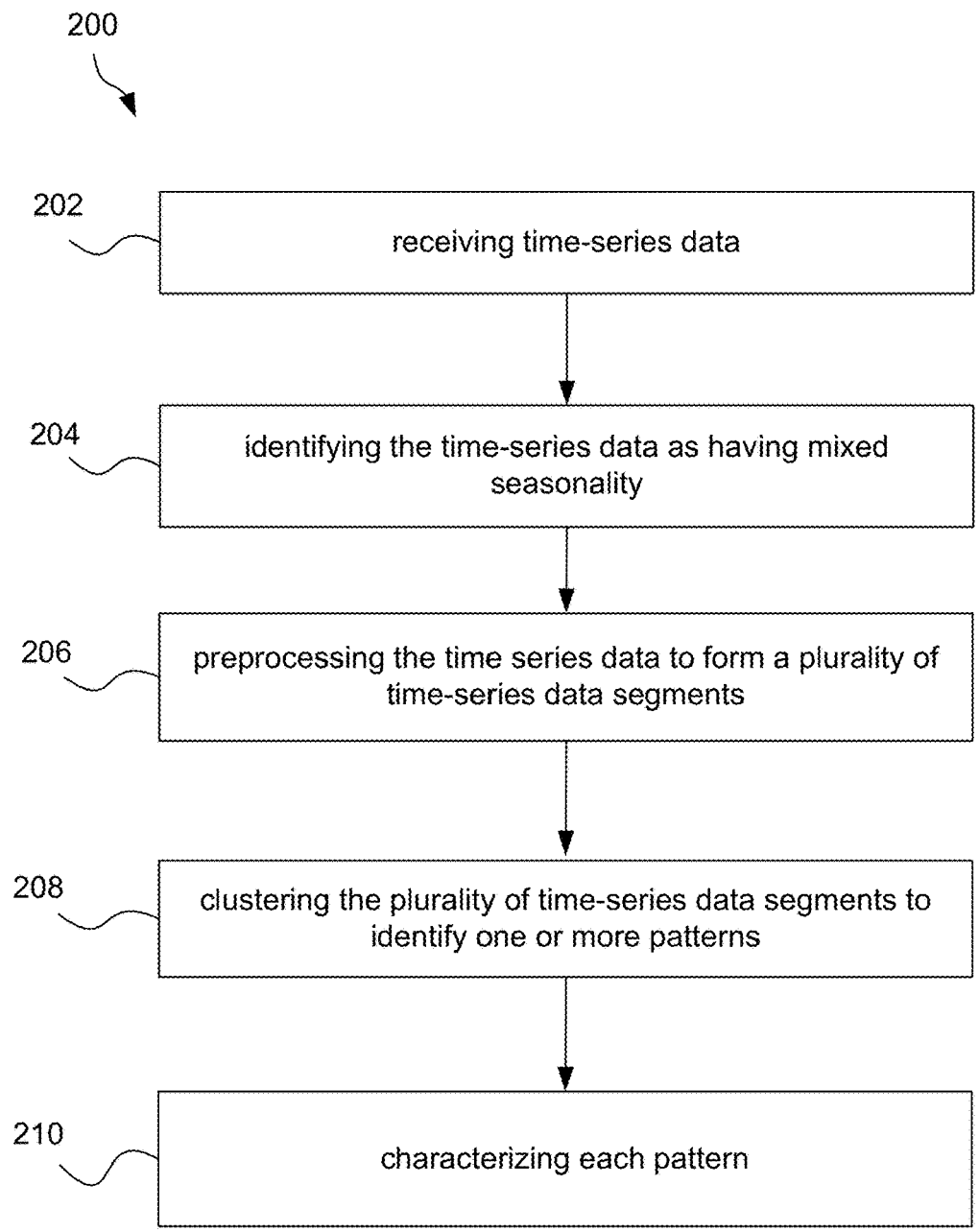
FIG. 2 illustrates a method for defining patterns in time-series data with mixed seasonality, in accordance with one embodiment.

FIG. 2 illustrates a method 200 for defining patterns in time-series data with mixed seasonality, in accordance with one embodiment. As an option, the method 200 may be implemented in the context of the details of the previous figure and/or any subsequent figure(s). For example, the method 200 may define patterns in batch, where the input to the method is a time-series, and the output is several daily patterns (or other patterns by defined time segment) with typical expected value and normal confidence range. Of course, however, the method 200 may be implemented in the context of any desired environment. Further, the aforementioned definitions may equally apply to the description below.

In operation 202, time-series data is received. The time-series data may be received for the purpose of defining patterns from the time-series data. Additionally, in operation 204, the time-series data is identified as having mixed seasonality. Identifying that the time-series data is of a mixed seasonality type may be accomplished by a machine learning algorithm that classifies the time-series data.

In operation 206 the time-series is pre-processed to form a plurality of time-series data segments (i.e. for clustering). The pre-processing may include:

Complete missing points (for example, with linear interpolation from adjacent points);

Resample (for example, extrapolate the time-series data so it will have data points corresponding to a desired unit of time);

Split the time-series data to segments (for example, split the time-series to days from midnight to midnight); and/or Normalize the time-series data segments (for example, subtract the minimum value point in the segment and then divide by the integral of the segment data).

Further, in operation 208, the time-series data segments are clustered to identify one or more patterns in the time-series data. To cluster the time-series data segments, a distance between each pair of time-series data segments is defined. Time-series data segments are represented by the top k Fourier coefficients for the time-series data segment. The distance between two time-series data segments in the k-dimensional space of the coefficients is the distance between the two time-series data segment representations in the k-dimensional space, with some decrease for higher coefficients (see Equation 1 for example).

$$D(s_1, s_2) = \sqrt{\sum_{i=1}^{k} \alpha^i (a_i(s_1) - a_i(s_2))^2}, \quad \text{Equation 1}$$

$a_i(s_1)$ is Fourier coefficient i for the time-series data segment $s1$

Figure 3:
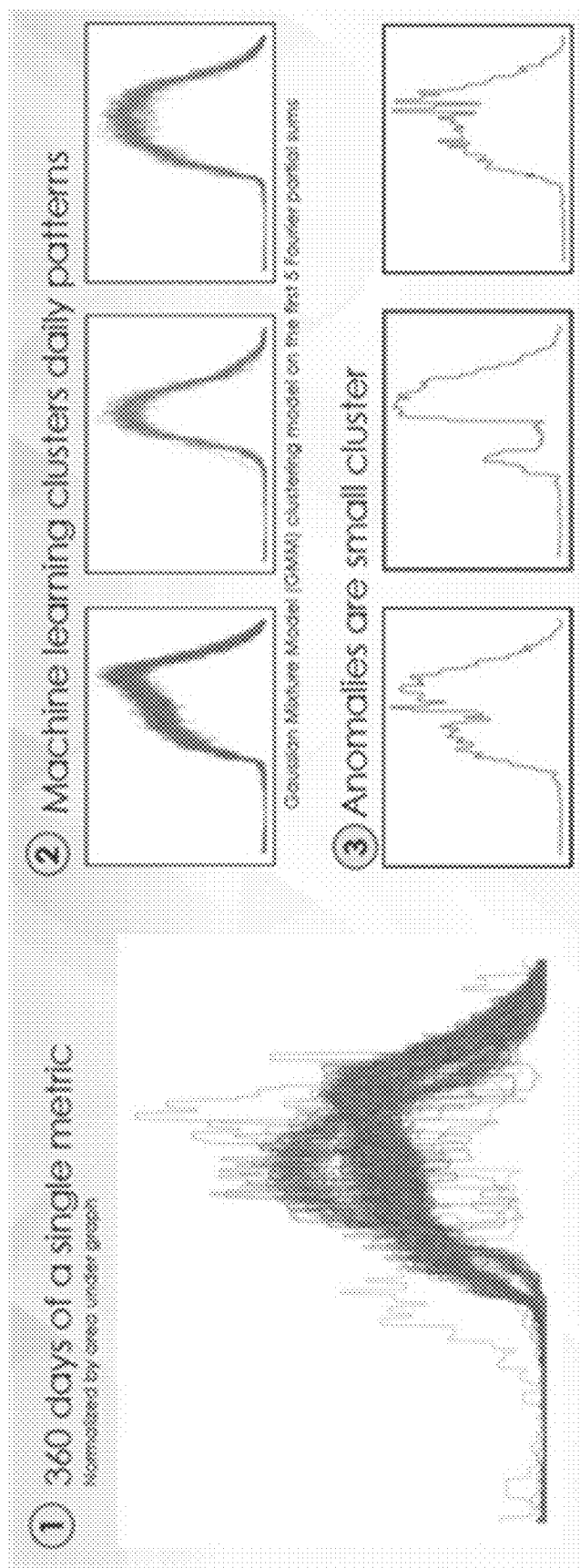
FIG. 3 illustrates a chart showing the definition of patterns versus anomalies, in accordance with one embodiment.

With the distance defined for any pair of time-series data segments, clustering of time-series data segments is done, for example with GMM. Clusters with more than m segments (i.e. a threshold number) are identified as patterns, whereas smaller clusters are anomalies, as shown in FIG. 3.

In operation 210, each pattern is characterized. A pattern cluster may be characterized by 3 new time-series data segments (lines):

1. A standard representative value (such as median or average for each sampled point in the time segment);
2. A lower bound and an upper bound that define the normal range of data points in the pattern. The lower and upper bounds are defined from any statistical inference from the data for a confidence interval defined by a user. For example, the administrator can select 99.9% confidence interval, and for example the upper and lower bound will be taken as upper and lower 0.05% of the data in the pattern with some smoothing.

Figure 4:
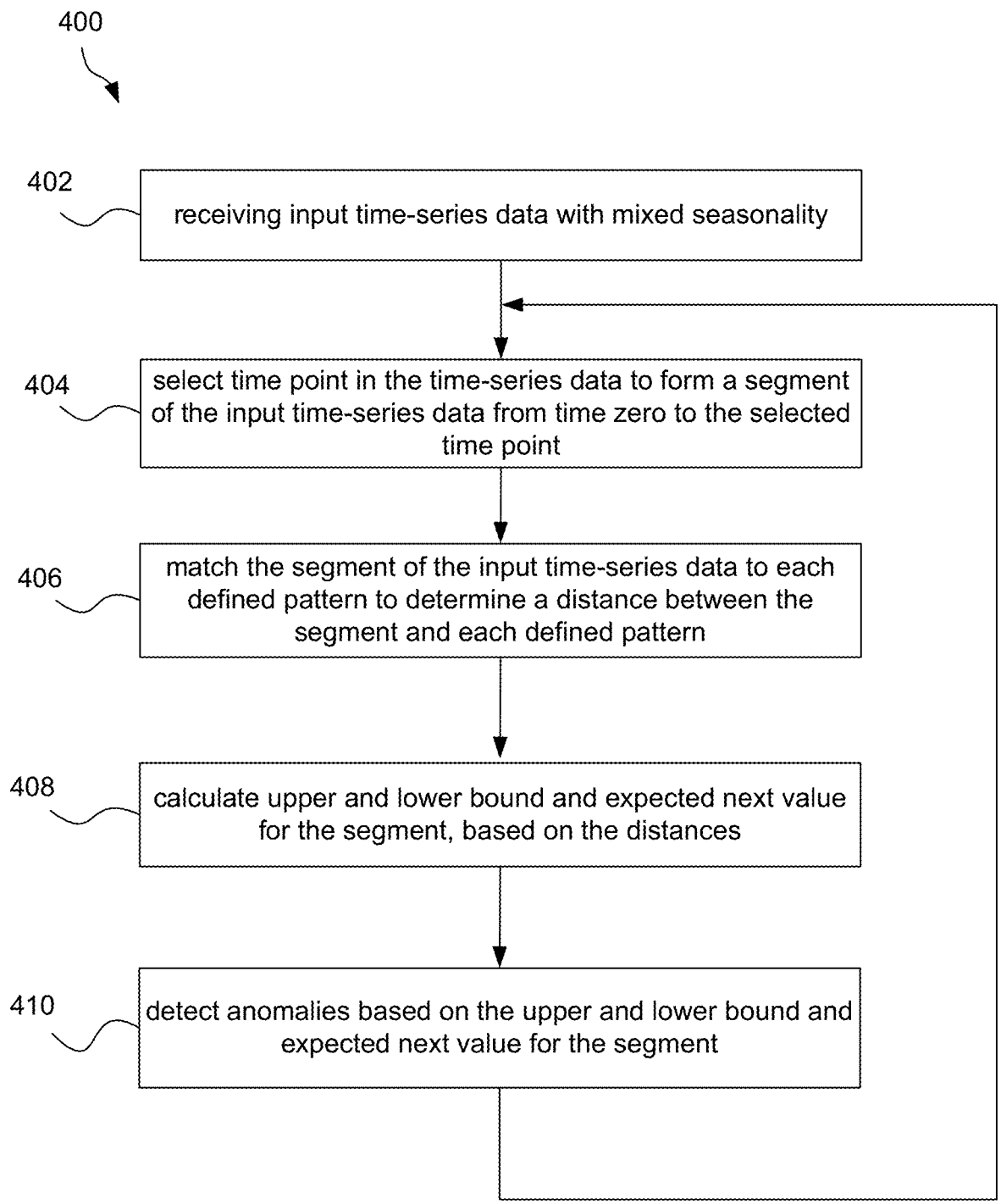
FIG. 4 illustrates a method for pattern matching to detect anomalies in time-series data having mixed seasonality, in accordance with one embodiment.

FIG. 4 illustrates a method 400 for pattern matching to detect anomalies in time-series data having mixed seasonality, in accordance with one embodiment. As an option, the method 400 may be implemented in the context of the details of the previous figure and/or any subsequent figure(s). For example, the method 400 may be performed using the patterns defined using the method 200 of FIG. 2. The method 400 may execute in near real-time (for example, every 5 minutes), in order to perform pattern matching on streaming input time-series data. The method 400 may be performed on current time-series data (i.e. generated for today up until the present time), and matches a pattern (e.g. daily pattern) of this time-series. Of course, however, the method 400 may be implemented in the context of any desired environment. Further, the aforementioned definitions may equally apply to the description below.

As shown in operation 402, input time-series data with mixed seasonality is received. Then, in operation 404, a time point (T) within the input time-series data is selected to form a segment of the input time-series data from time zero to the selected time point T.

Additionally, in operation 406, the segment is matched to each defined pattern to determine a distance between the segment and each defined pattern. For example, the segment from time zero to time T is matched to each possible pattern from its time zero to time T. The match to a pattern (p) finds the distance between actual data in the segment and the pattern p. One way to calculate the distance is to find a multiplier volume (v) that minimizes the total error between the actual data and pattern p from time zero to time T. Errors can be measured using several options, for example L1 or L2, or a decaying L2 as in Equation 2 below. Other options for calculating distance include predicting the distance between the actual data and the pattern by the end of the time-period (e.g. end of day), given various features such as concurrent data, day of the week, concurrent time and external features.

$$\text{pattern\_distance}(\vec{y}_{p,T}, \vec{y}_T) = \min_{v_p} \sum_{t=0}^{T} \alpha^{T-t} (v_p y_t - y_{p,t})^2$$

$$\vec{y}_T = \begin{pmatrix} y_1 \\ \vdots \\ y_T \end{pmatrix} \text{ is the incoming time-segment to alert on in time } T$$

$$\vec{y}_{p,T} = \begin{pmatrix} y_{p,1} \\ \vdots \\ y_{p,T} \end{pmatrix} \text{ is the pattern } p \text{ time-segment from time zero to time } T$$

After the distance between the actual data and each pattern is calculated, the upper and lower bound and an expected value are calculated, as shown in operation 408. This may be calculated by either (1) a minimal distance pattern match, or (2) a soft-max approach. Minimal distance pattern match means that a single pattern is selected and the standard line and bounds for the predicted points are taken as in the selected pattern (multiplied by the matching volume). A soft-max approach means that the distance defines weights 0-1 for each pattern, such that the closest pattern to the actual data gets the highest weight. For each pattern, the high-bound in time T is multiplied by $v_p$ to find the predicted high-bound by this pattern. The high-bound for the actual data is taken as a weighted average of the predicted bounds. The same approach of weighted averages goes to calculating the lower bound and the predicted next value.

Then, in operation 410, anomalies are detected for the segment based on the upper and lower bound and the expected value. The method 400 returns to operation 404 to perform pattern matching for a next selected time point in the input time-series data.

Figure 5:
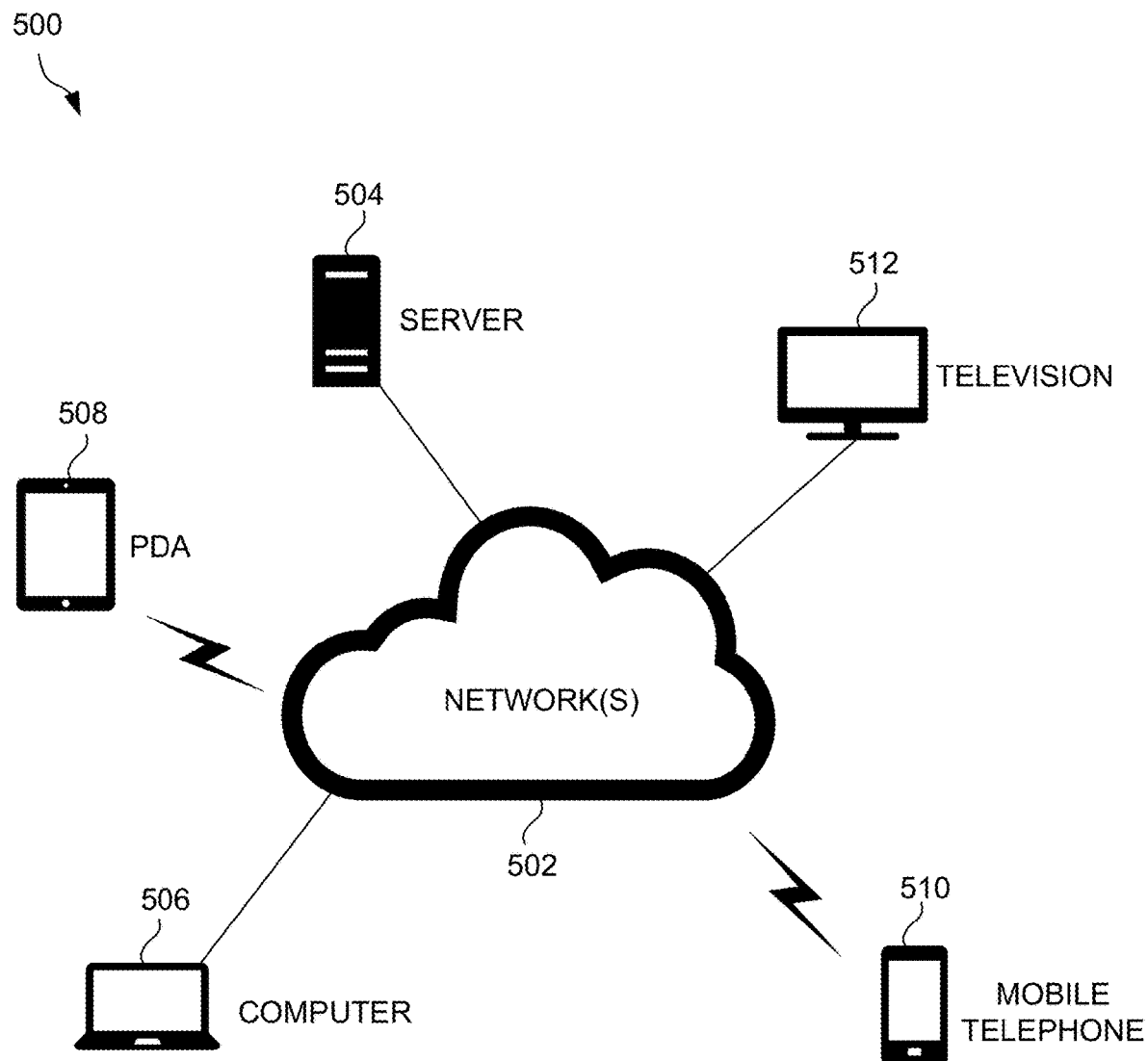
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
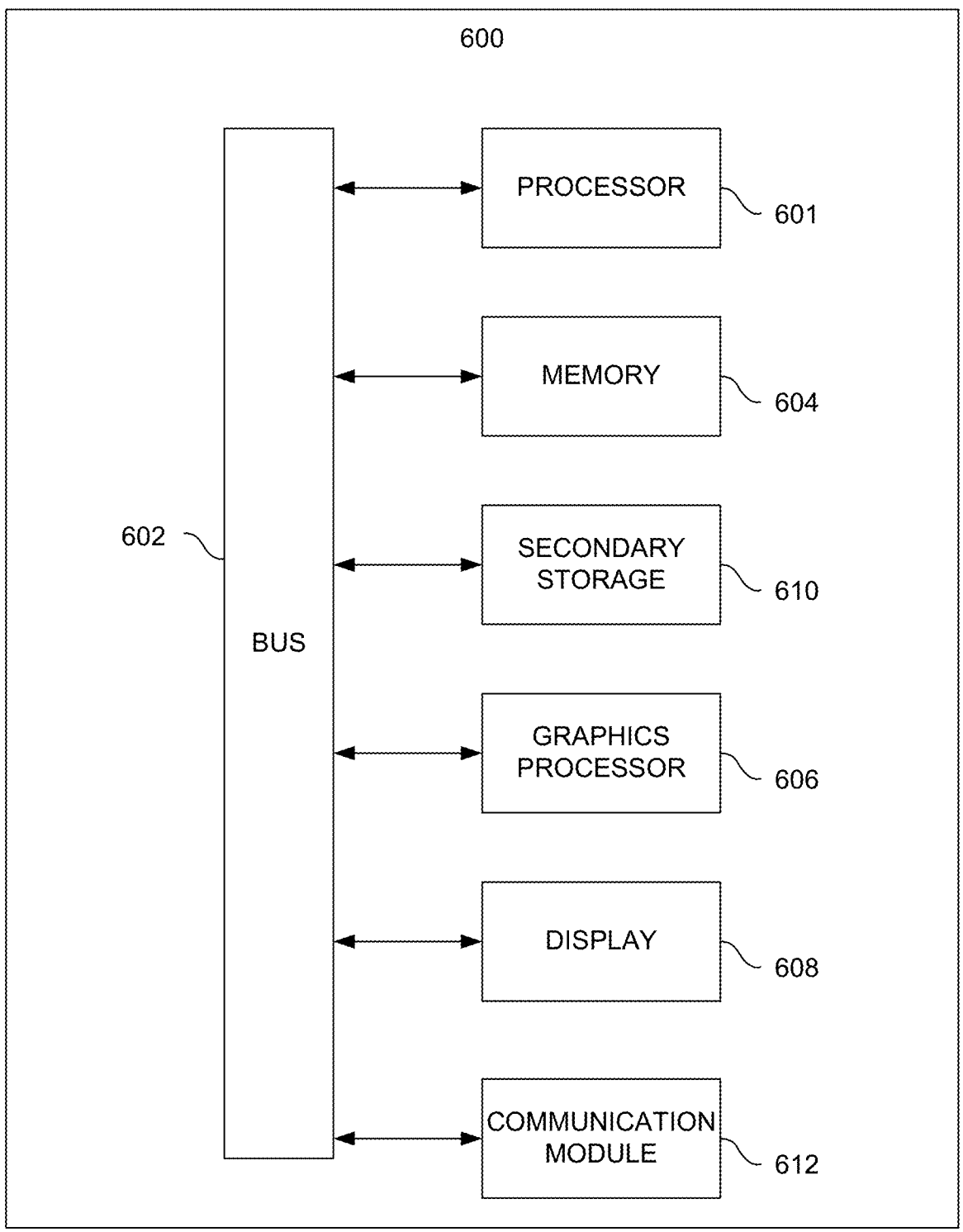
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:

receiving time-series data of a single time-series having a sequence of data points in a successive time-based order, the time-series data being of a mixed seasonality type by having portions that repeat on a time-wise basis;

segmenting the time-series data, by a single defined unit of time, to form a plurality of time-series data segments each having a different subset of the data points in the single time-series;

processing the plurality of time-series data segments to determine one or more patterns across the plurality of time-series data segments;

storing the one or more patterns with a characterization that includes:
: a standard representative value for each sampled time segment point,
: a lower bound of data in the pattern for a defined confidence interval, and
: an upper bound of data in the pattern for the defined confidence interval,
: wherein the lower bound and the upper bond defined a normal range of data points in the pattern; and detecting one or more anomalies in an input time-series, based on the stored one or more patterns, by:
: determining a plurality of segments for the input time-series, including for each time point in the input time-series determining a segment in the input time-series from time zero to the time point, and
: for each segment of the plurality of segments:
: (a) determining a distance between the segment in the input time-series and each pattern of the stored one or more patterns,
: (b) selecting a particular pattern of the stored one or more patterns having a least distance to the segment,
: (c) predicting a range of upcoming normal values for the input time-series, wherein the range is predicted as characterized in the particular pattern, and
: (d) detecting an anomaly for the segment based on a data point within the input-time series being out of the range.

2. The non-transitory computer readable medium of claim 1,
wherein the time-series data is identified as being of the mixed seasonality type, using a machine learning algorithm.

3. The non-transitory computer readable medium of claim 1, further comprising:
pre-processing the time-series data prior to segmenting the time-series data.

4. The non-transitory computer readable medium of claim 3, wherein pre-processing the time-series data includes completing missing points within the time-series data with linear interpolation from adjacent points.

5. The non-transitory computer readable medium of claim 3, wherein pre-processing the time-series data includes re-sampling the time-series data by extrapolating the time-series data so it will have data points corresponding to a desired unit of time.

6. The non-transitory computer readable medium of claim 1, wherein the defined unit of time is one day beginning at a defined start time.

7. The non-transitory computer readable medium of claim 1, further comprising:
normalizing each time-series data segment of the plurality of time-series data segments.

8. The non-transitory computer readable medium of claim 7, wherein each time-series data segment of the plurality of time-series data segments is normalized by subtracting a minimum point value in the time-series data segment to obtain a resulting time-series data segment and dividing the resulting time-series data segment by an integral of data included in the resulting time-series data segment.

9. The non-transitory computer readable medium of claim 1, wherein processing the plurality of time-series data segments to determine the one or more patterns across the plurality of time-series data segments includes:
clustering the time-series data segments into a plurality of clusters.

10. The non-transitory computer readable medium of claim 9, wherein the time-series data segments are clustered by:
defining a distance between each pair of time-series data segments of the plurality of time-series data segments, and
grouping the plurality of time-series data segments into the plurality of clusters, based on the distances defined for the plurality of time-series data segments.

11. The non-transitory computer readable medium of claim 10, wherein the distance is defined using Fourier coefficients.

12. The non-transitory computer readable medium of claim 10, wherein the grouping is performed using Gaussian mixture model.

13. The non-transitory computer readable medium of claim 10, wherein each cluster of the plurality of clusters is determined to be a pattern of the one or more patterns when the cluster includes at least a threshold number of time-series data segments of the plurality of time-series data segments.

14. The non-transitory computer readable medium of claim 1, wherein the standard representative value is an average for each sampled point in a representative time-series data segment.

15. A method, comprising:
receiving time-series data of a single time-series having a sequence of data points in a successive time-based order, the time-series data being of a mixed seasonality type by having portions that repeat on a time-wise basis;
segmenting the time-series data, by a single defined unit of time, to form a plurality of time-series data segments each having a different subset of the data points in the single time-series;
processing the plurality of time-series data segments to determine one or more patterns across the plurality of time-series data segments;
storing the one or more patterns with a characterization that includes:
: a standard representative value for each sampled time segment point,
: a lower bound of data in the pattern for a defined confidence interval, and
: an upper bound of data in the pattern for the defined confidence interval,
: wherein the lower bound and the upper bond defined a normal range of data points in the pattern; and
detecting one or more anomalies in an input time-series, based on the stored one or more patterns, by:
: determining a plurality of segments for the input time-series, including for each time point in the input time-series determining a segment in the input time-series from time zero to the time point, and
: for each segment of the plurality of segments:
: (a) determining a distance between the segment in the input time-series and each pattern of the stored one or more patterns,
: (b) selecting a particular pattern of the stored one or more patterns having a least distance to the segment,
: (c) predicting a range of upcoming normal values for the input time-series, wherein the range is predicted as characterized in the particular pattern, and (d) detecting an anomaly for the segment based on a data point within the input-time series being out of the range.

16. A system, comprising:

a non-transitory memory storing instructions; and one or more processors in communication with the non-transitory memory that execute the instructions to perform a method comprising:

receiving time-series data of a single time-series having a sequence of data points in a successive time-based order, the time-series data being of a mixed seasonality type by having portions that repeat on a time-wise basis;

segmenting the time-series data, by a single defined unit of time, to form a plurality of time-series data segments each having a different subset of the data points in the single time-series;

processing the plurality of time-series data segments to determine one or more patterns across the plurality of time-series data segments;

storing the one or more patterns with a characterization that includes:
  a standard representative value for each sampled time segment point,
  a lower bound of data in the pattern for a defined confidence interval, and
  an upper bound of data in the pattern for the defined confidence interval,
  wherein the lower bound and the upper bond defined a normal range of data points in the pattern; and detecting one or more anomalies in an input time-series, based on the stored one or more patterns, by:
  determining a plurality of segments for the input time-series, including for each time point in the input time-series determining a segment in the input time-series from time zero to the time point, and
  for each segment of the plurality of segments:
    (a) determining a distance between the segment in the input time-series and each pattern of the stored one or more patterns,
    (b) selecting a particular pattern of the stored one or more patterns having a least distance to the segment,
    (c) predicting a range of upcoming normal values for the input time-series, wherein the range is predicted as characterized in the particular pattern, and
    (d) detecting an anomaly for the segment based on a data point within the input-time series being out of the range.

17. The non-transitory computer readable medium of claim 1, wherein the anomaly is detected for the segment based on the upper bound, the lower bound, and the standard representative value of the particular pattern, wherein the standard representative value is an expected value.

\* \* \* \* \*